US008645626B2

(12) United States Patent
Mittendorff et al.

(10) Patent No.: US 8,645,626 B2
(45) Date of Patent: *Feb. 4, 2014

(54) HARD DISK DRIVE WITH ATTACHED SOLID STATE DRIVE CACHE

(75) Inventors: Steffen Mittendorff, Heilbronn (DE); Dieter Massa, Erlenbach (DE)

(73) Assignee: PMC-Sierra US, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/455,058

(22) Filed: Apr. 24, 2012

(65) Prior Publication Data

US 2012/0210058 A1    Aug. 16, 2012

Related U.S. Application Data

(63) Continuation of application No. 12/388,775, filed on Feb. 19, 2009, now Pat. No. 8,195,878.

(51) Int. Cl.
*G06F 12/00* (2006.01)
*G06F 12/08* (2006.01)

(52) U.S. Cl.
USPC ........... 711/118; 711/100; 711/111; 711/112; 711/113; 711/114; 711/136; 711/160; 711/E12.001; 711/E12.019

(58) Field of Classification Search
USPC ................ 711/100, 111–114, 118, 136, 160, 711/E12.001, E12.019
See application file for complete search history.

(56) References Cited

U.S. PATENT DOCUMENTS

| 6,467,022 | B1* | 10/2002 | Buckland et al. | 711/113 |
| 8,028,121 | B2* | 9/2011 | Jeong | 711/103 |
| 2010/0049902 | A1* | 2/2010 | Kakihara et al. | 711/103 |

* cited by examiner

*Primary Examiner* — Jasmine Song
(74) *Attorney, Agent, or Firm* — Martine Penilla Group, LLP

(57) ABSTRACT

Methods, systems, and computer programs for managing storage using a solid state drive (SSD) read cache memory are presented. One method includes an operation for determining whether data corresponding to a read request is available in a SSD memory when the read request causes a miss in a memory cache. The read request is served from the SSD memory when the data is available in the SSD memory, and when the data is not available in the SSD memory, SSD memory tracking logic is invoked and the read request is served from a hard disk drive. Invoking the SSD memory tracking logic includes determining whether a fetch criteria for the data has been met, and loading the data corresponding to the read request in the SSD memory when the fetch criteria has been met. The use of the SSD as a read cache improves memory performance for random data reads.

19 Claims, 5 Drawing Sheets

Write IO

HARD DISK DRIVE WITH ATTACHED SOLID STATE DRIVE CACHE

CLAIM OF PRIORITY

This application is a Continuation Application under 35 USC §120 and claims priority from U.S. application Ser. No. 12/388,775, entitled "Hard Disk Drive with Attached Solid State Drive Cache", and filed on Feb. 19, 2009 now U.S. Pat. No. 8195878, and is herein incorporated by reference.

BACKGROUND

The present invention relates to methods, systems and computer programs for improving the read performance on storage systems with Hard Disk Drives (HDD).

Currently, HDD based Input/Output (IO) performance is limited, especially in random read situations. Sequential reads can be served out of a dynamic RAM (DRAM) based cache associated with the HDD through prefetching, which can be performed on parallel streams. Both random and sequential write performance are improved by the use of caches, such as DRAM caches. Caches absorb a number of write IOs and HDDs can be used effectively independently from the IO depth.

Random reads typically can't be served out of the cache and HDD head strokes (reads) are required to access the data on the storage media. Additionally, the effective use of HDDs depends on the IO queue depth (at a queue depth of one the random read performance is equal to the random read performance of one drive.)

It is in this context that embodiments of the invention arise.

SUMMARY

Embodiments of the present invention provide methods, systems, and computer programs for managing storage in a computer system using a solid state drive (SSD) read cache memory. The method includes receiving a read request, which causes a miss in a RAM cache. After the RAM cache miss, the method determines whether the data to satisfy the read request is available in the SSD memory. If the data is in SSD memory, the read request is served from the SSD memory. Otherwise, SSD memory tracking logic is invoked and the read request is served from a hard disk drive (HDD). Additionally, the SSD memory tracking logic determines whether a fetch criteria for the data has been met, the fetch criteria determining which requests for data are associated with reading random data, and loads the data corresponding to the read request in the SSD memory when the fetch criteria has been met. In another embodiment, a computer program implements the method.

In another embodiment, a method includes an operation for determining whether data corresponding to a read request is available in a solid state drive (SSD) memory when the read request causes a miss in a memory cache. The method further includes an operation for serving the read request from the SSD memory when the data is available in the SSD memory. SSD memory tracking logic is invoked and the read request is served from a hard disk drive (HDD) when the data is not available in the SSD memory. Invoking the SSD memory tracking logic includes determining whether a fetch criteria for the data has been met, the fetch criteria determining which requests for data are associated with reading random data, and loading the data corresponding to the read request in the SSD memory when the fetch criteria has been met. In addition, the SSD memory acts as a memory read cache and the SSD memory does not act as a write memory cache.

In another embodiment, a system for managing computer storage is presented. The system includes a cache manager, HDD storage, a RAM cache, and an SSD cache. The RAM cache and the SSD cache store data from HDD storage. The cache manager determines whether data corresponding to a read request is available in the SSD cache when the read request causes a miss in the RAM cache. The read request is served from the SSD memory if the data is available in the SSD memory. If the data is not available in the SSD cache, then SSD memory tracking logic is invoked and the read request is served from the HDD storage. The SSD memory performs as a read cache for the HDD storage, but it does not perform as a write cache.

It should be appreciated that the present invention can be implemented in numerous ways, such as a process, an apparatus, a system, a device or a method on a computer readable medium. Several inventive embodiments of the present invention are described below.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Current HDDs do not perform well for random reads because data has to be read from the HDD. Sequential data can be detected and pages loaded in the DRAM cache, thus making the read performance much better for sequential reads than for random reads. In a typical implementation, sequential IO rates of 150 Mb/sec can be achieved.

SSDs are capable of delivering a high random read throughput, but are considerably more expensive than HDDs. SSDs do not have the head positioning delay of HDDs and can deliver random data at a much higher rate. For example, a typical SDD can deliver 10,000 to 15,000 IOs per second or more, while an HDD delivers in the range of 300-400 IOs per second. Embodiments of the present invention present storage systems that combine the lower-priced mass storage space of HDDs with the high random read performance of SSDs in mixed random and sequential workload applications. In one embodiment, the estimated amount of used random data is used to determine the size of the SSD to improve the efficiency of the storage subsystem.

It should be noted that embodiments of the present invention apply to systems that include devices with low random read performance, such as HDDs, CDs, DVDs, tapes, etc. The system storage performance can be improved by using a device with better read IO random performance, such as an SSD. For simplicity of description, embodiments of the present invention are described using HDDs and SSDs, but other combinations of low and high random read performance devices can be used.

Figure 1:
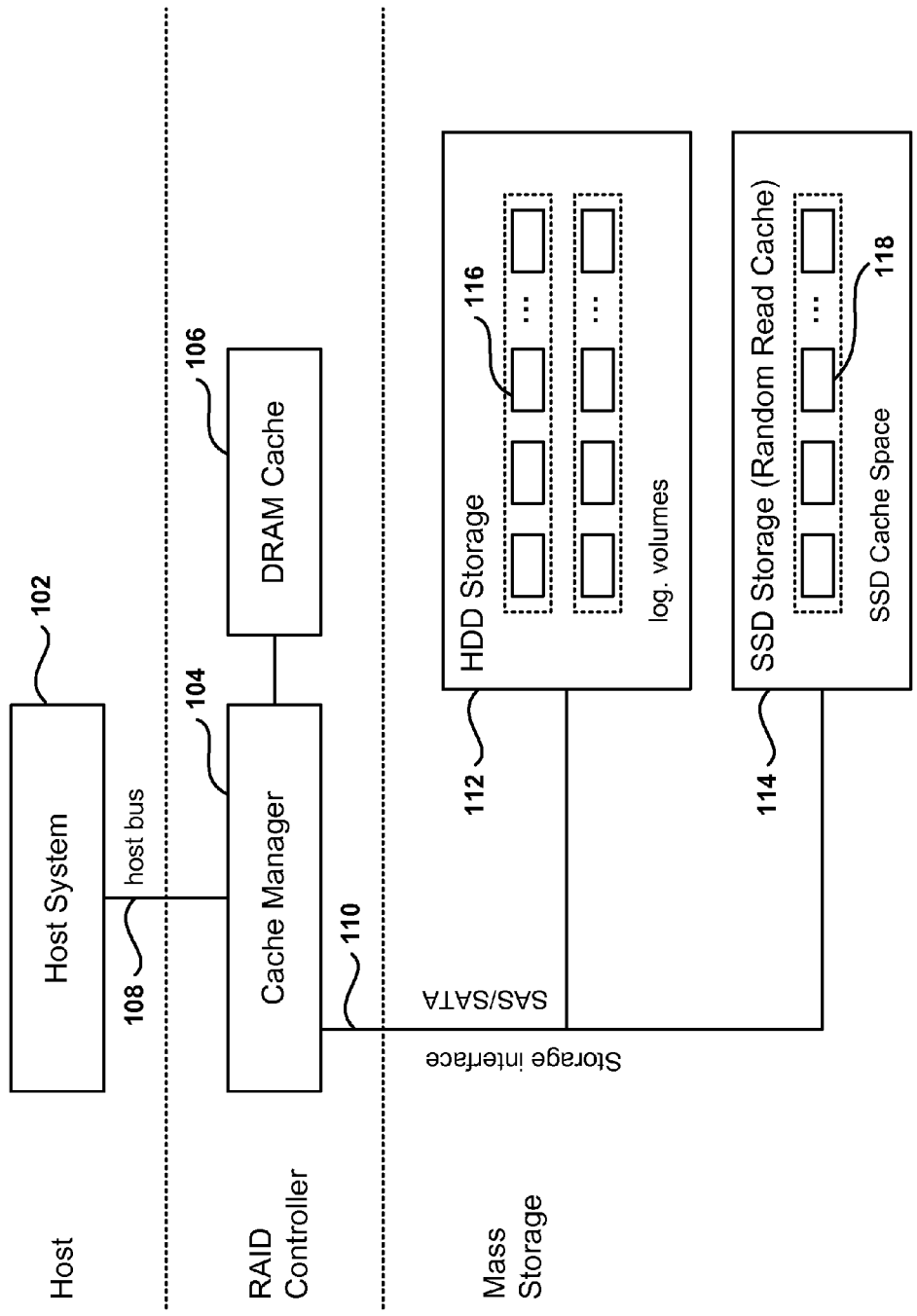
FIG. 1 depicts HDDs with attached Random Read (RR) Solid State Drive (SSD) cache, according to one embodiment.

FIG. 1 depicts HDDs with attached Random Read (RR) Solid State Drive (SSD) cache 114, according to one embodiment. Host system 102 is connected via host bus 108 to cache manager 104. The RAID controller cache manager 104 is connected to DRAM cache 106, to HDD storage 112, and to SSD storage 114 via storage interface 110. One or more SAS or SATA drives with a high random read performance (typically SSDs) are configured as random read cache (RR cache) 114 space. The HDD and SSD storage may include one or more drives, such as drives 116 and 118. In one embodiment, single physical drives are added to the RR cache space. The read caching can be enabled or disabled on per-HHD basis, or per-HHD-set basis, in the logical drive configuration. A set of SSD drives can be dedicated to a set of HDD drives, but other configurations are possible, such as having all SSD drives associated with all the HDD drives.

In one embodiment, the RR cache space is organized in pages, but other configurations are also possible. The RR cache page size can be adjusted to match multiples of typical erase block sizes. For example, the RR cache page size is 256 KB, but other page sizes are possible, such as 512 KB, 1 MB, 2 MB, etc. The RR cache page size can also be determined dynamically depending on information about erase block sizes, performance measurements, the RR cache size, and the amount of controller RAM.

RR cache pages are filled by a background task in one embodiment, as described below in reference to FIG. 3. The frequency of cache page updates is balanced against the current host IO load and depends on the assumed future demand for this data. The overall goal is to fill the RR cache with all repeatedly read random data, such that future random reads to this data will be served from the RR cache instead of the HDD storage. To achieve this, pages that contain random read data are fetched into the RR cache. At the same time, infrequently used pages are sorted out of the RR cache and re-used.

Some DRAM cache prefetch logic methods use a hash table with a number of elements that are used to track read IOs. These elements are used to trigger two kinds of fetch operations: one is the prefetch for one or more sequential streams, and the other is the fetch of data that is repeatedly read. The hash size and the number of elements can be relatively low (i.e., 256), as the main purpose is the detection of multiple sequential streams. Repeated reads that are more than a certain number (i.e., 256) of non-sequential IOs apart are not detected. Typical DRAM prefetch logic detects sequential reads, allowing DRAM cache to perform well for sequential reads. The prefetch logic also includes loading of some random data, but the IO performance improvement is significantly less than for sequential reads.

In one embodiment, the DRAM cache loads data from the SSD memory if the data is in the SSD memory, and from the HDD storage otherwise. In yet another embodiment, the RR cache can be used to store multiple copies of the same data on different SSDs. This provides redundancy and additional performance improvement through the distribution of requests to different SSDs.

The configuration of a RR cache is simple and flexible and includes full support for existing HDDs or HDD sets. In addition, caching can be turned on or off per HDD or per HDD set, and the RR cache can be removed and replaced seamlessly. In a basic RR cache configuration, a simple RR cache lookup is used instead of a full scale mapping and the use of a virtualization layer. This results in the incorporation of functions and features which are already in use for DRAM cache support.

As previously discussed, one SSD drive can be associated with a single HDD drive. This configuration can be expanded to include multiple SSD drives working in association with multiple HDD drives, where the number of SSD drives does not have to be the same as the number of HDD drives, although that configuration is also possible. The set of HDDs, or even a subset of the available HDDs, can be used for primary storage, e.g. a redundant array of disks (RAID 0, 1, 5, 6). Similarly, the set of SSDs, or a subset of the SSDs, is used for caching, e.g. a redundant array of disks (RAID 0, 1, 5, 6).

In yet another embodiment, SSD drives can be used not only for caching HDD data but also to perform as an independent SSD drive containing data which is not in the HDD drives. In some applications, redundancy is required, which results in additional storage requirements. Performance can be improved in the case of writes to the SSD-based data by only involving SSDs. In yet another embodiment, a caching solution provides an alternative path to access the same data. Sequential data remains intact, contrary to a mapping solution. For example, one large file can be partially RR cached while at the same time remain sequential.

Figure 2:
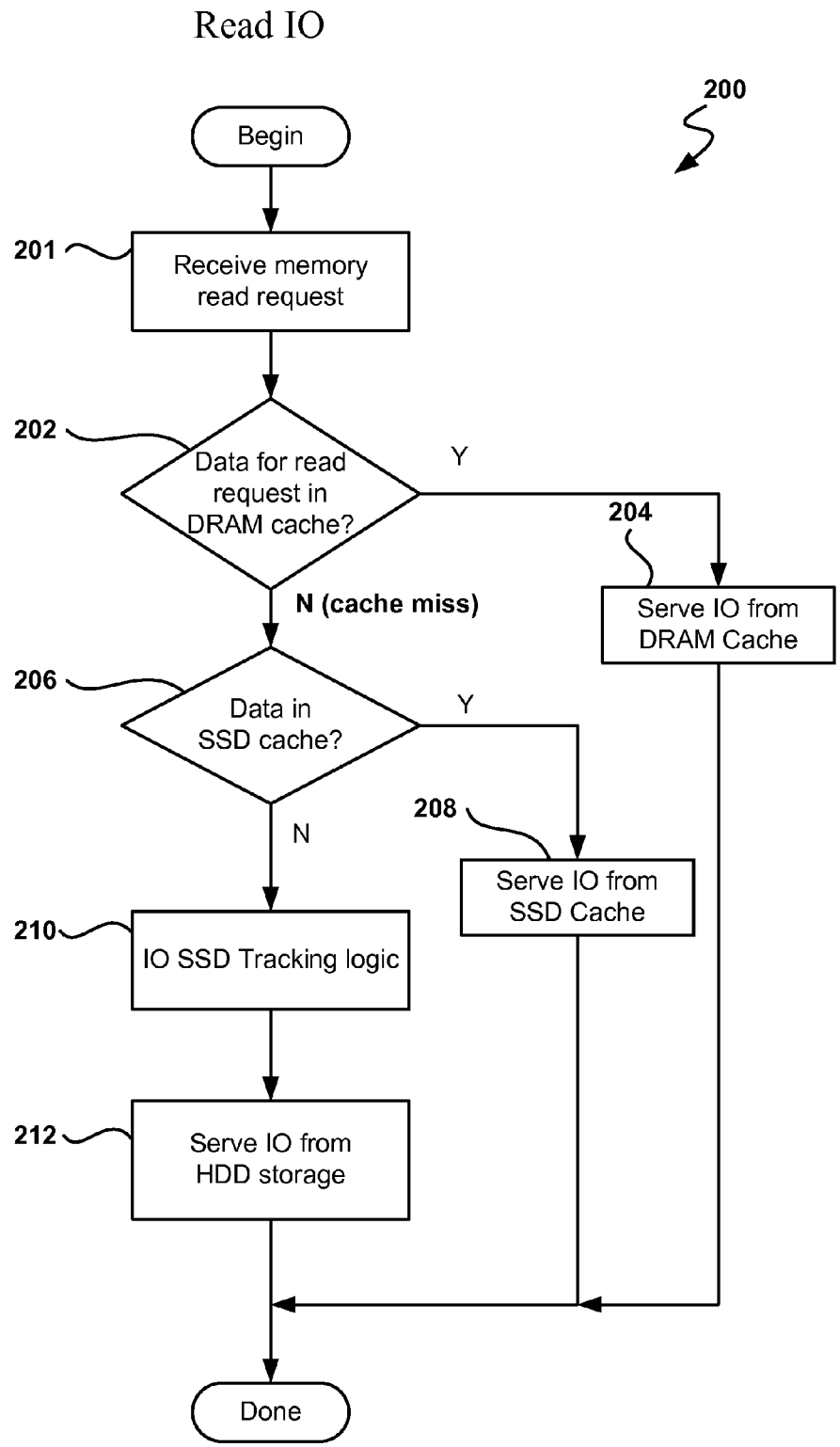
FIG. 2 illustrates a memory read operation method, according to one embodiment.

FIG. 2 illustrates a memory read operation method, according to one embodiment. RR cache fetches always cover complete pages, but other fetching algorithms are possible. As no RR cache writes, other than those during page fetches occur, valid information or other flags always refer to a complete page.

Once a read request is received in operation 201, the cache manager checks if the data is stored in DRAM cache in operation 202. If the data is in the DRAM cache, then the data is served from the DRAM cache in operation 204, and the IO read is complete. If the data is not in the DRAM cache, then the method checks if the data is in SSD cache in operation 206. If the data is in the SSD cache, then the read is served from the SSD cache in operation 208. Otherwise, the IO tracking logic is invoked next in operation 210.

In case of one or multiple sequential streams, the DRAM cache prefetch logic does read ahead IOs. As a result, streams of sequential IOs are served purely out of the DRAM cache and can completely bypass the RR cache logic. In case of a RR cache miss, a fetch may be triggered, and the IO is served from the HDD in operation 212. Any write IOs to the HDD bypass the RR cache and go directly to the targeted HDD. Write IOs that hit a RR cache page would invalidate the page. In another embodiment, the write IO is used to trigger a re-fetch of the RR cache page. It should be noted, that the DRAM tracking logic can also be invoked when the data is not found in the DRAM cache.

Figure 3:
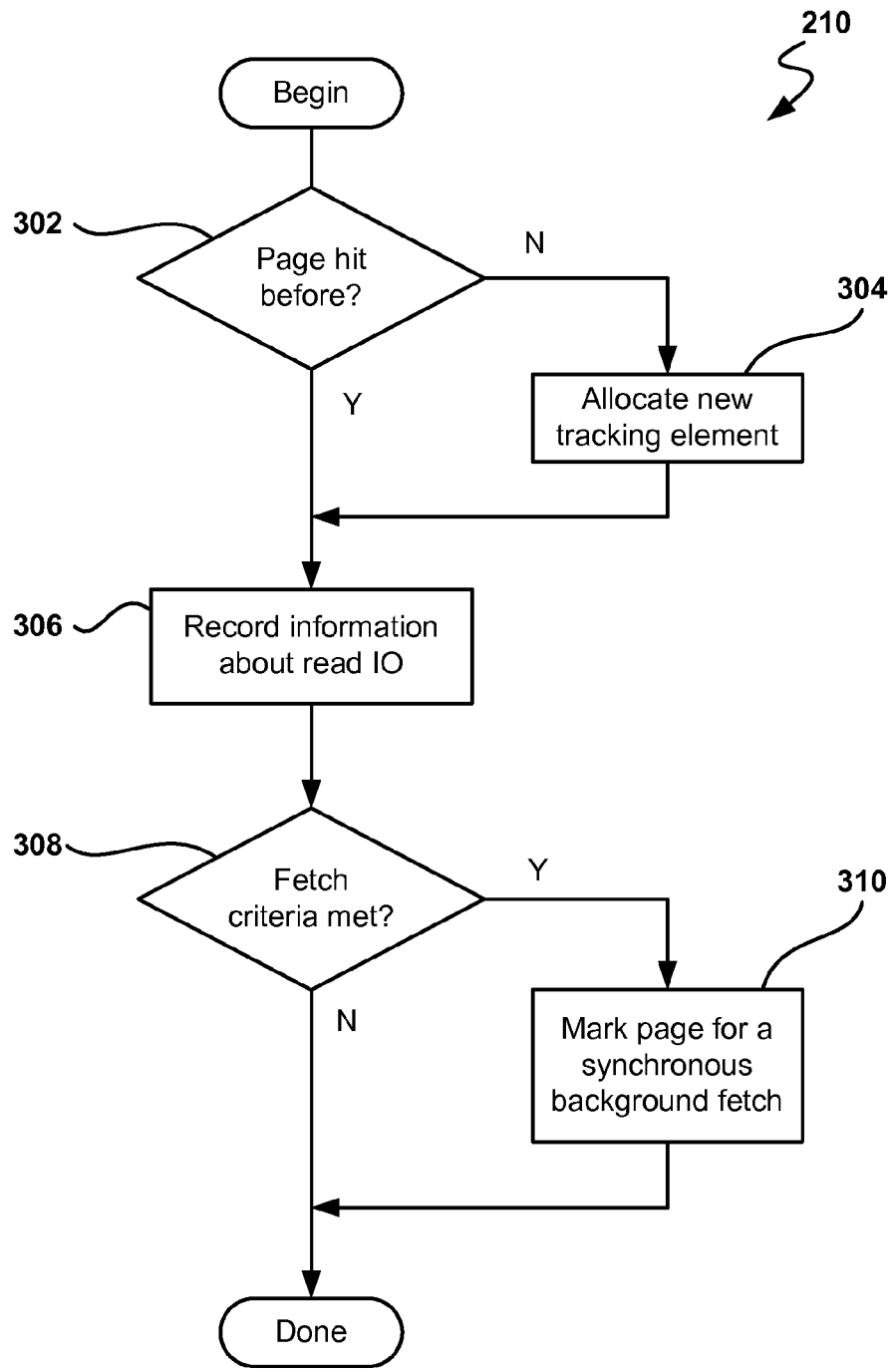
FIG. 3 shows the flow for tracking a read IO for SSD Caching in accordance with one embodiment of the invention.

FIG. 3 shows flow 210 for tracking a read IO for SSD Caching in accordance with one embodiment of the invention. The IO tracking logic is used to determine which pages should be loaded in the SSD cache. In one embodiment, a different process, other than the one running the cache manager, performs the data fetches for the RR cache. In case of a RR cache miss, the information about the random read IO is used as input for the fetch logic.

In one embodiment, a miss causes the direct scheduling of a fetch, but other methods, such as the one shown in FIG. 3, take into consideration other parameters to determine if a fetch is performed. Once the IO SSD tracking logic is invoked, the method checks if the page was hit before in operation 302, or in other words, if the page is being tracked already by the IO SSD cache tracking logic. If the page is not being tracked, a new tracking element is added to the data structures used by the SSD IO tracking logic in operation 304.

In operation 306, the method records information regarding the IO read request in the corresponding data structures. The method checks if a certain page fetch criteria has been met in operation 308. If the criteria has been met, then the page is marked for an asynchronous background fetch in operation 310, which can be performed by a separate process. The fetch criteria determines which requests for data are associated with random data reads. In one embodiment, the fetch criteria includes a page read counter. Once the page read counter reaches a certain threshold, then the page is marked for fetching. In another embodiment, the fetch criteria also tracks the age of the read requests, and the read counter can be updated to eliminate requests performed before a given amount of time. In yet another embodiment, the read counter is reset to zero periodically. The fetch criteria can also be used with an LRU (least-recently-used) scheme to discard from the SSD cache pages that have not been used recently.

When the fetch logic includes a counter of the number of read requests for that page, once a threshold number is reached, the fetch logic will initiate the loading of the data in the RR cache. For example, the fetch logic adds the page required to a fetch list, and another process executes the loading of the page to the RR cache from the HDD.

For scheduling and tracking of fetches, one embodiment incorporates a list with an overlaying hash. The process of fetching, based upon the fetch list, can be configured more or less aggressive in terms of the number of parallel fetches, the balancing of fetches against host IOs and the maximum rate of fetches per time period. A fetch is done by a RR cache-page-sized read IO to the HDD followed by a write IO to the SSD. In one embodiment with a RR cache page size of 256 KB, it is possible to align the fetch-IO SSD writes with typical erase block sizes.

In another embodiment, as part of a clean shutdown, the RR cache state is flushed as on-drive metadata, so the state is available after a reboot, providing the full performance of the RR cache without having to start the fetching process from scratch. Considering a RR cache size of several hundred GB, it would take a long time (hours) to fill the cache with random data. During the cache fill time, random reads go to the HDD first, and there is an additional performance impact by the fetch process itself. On-disk metadata provides fast random reads from controller startup on, which also accelerates Operating System (OS) and application boot times.

In one embodiment, similar to the DRAM cache, the RR cache works on cache page size granularity. The only mapping is the mapping of a RR cache page into the HDD space, aligned to RR cache page size boundaries. Any reads to the HDD space that can be served by the RR cache would be redirected to the SSD. In case of 256 KB RR cache page size, the lower 9 bits of the LBA address the offset inside the page. The upper bits are used for hash lookup and are modified for RR cache reads according to the mapping for a RR cached page. In one embodiment, the logic associated with RR cache fetches is independent from the logic used for DRAM cache fetches, while in another embodiment, the logics for fetching DRAM and RR cache data are combined and controlled by the same caching logic.

In one implementation, the runtime metadata is kept in controller RAM, and the RR cache page control block size is 20 Bytes. Assuming a 128 GB SSD RR cache and a RR cache page size of 256 KB, the table of page control blocks consumes approximately 10 MB, with the RR cache fetch logic's hash table and other metadata consuming a few more MB. If the RR cache size employed is in the Terabyte range, the RR cache page size can be increased depending on the amount of controller RAM. By choosing a suitable page size and a lowered upper limit for the maximum SSD cache size, even storage controllers with significantly reduced DRAM size can implement RR caching (e.g. at a RR cache page size of 1 MB, up to 512 GB of RR cache can be supported by slightly more than 10 MB of DRAM).

Given the fact that the RR cache is not used as single point of storage for data, there is no need for redundancy or, dirty shutdown support nor to flush/migrate data upon a RR cache page replacement. In other words, the SSD memory acts as a memory reach cache, while the SSD memory does not act as a write memory cache. In yet another embodiment, the SSD cache is initialized without any data after a dirty shutdown. Furthermore, the RR cache size can be adjusted easily to match the amount of random data.

Figure 4:
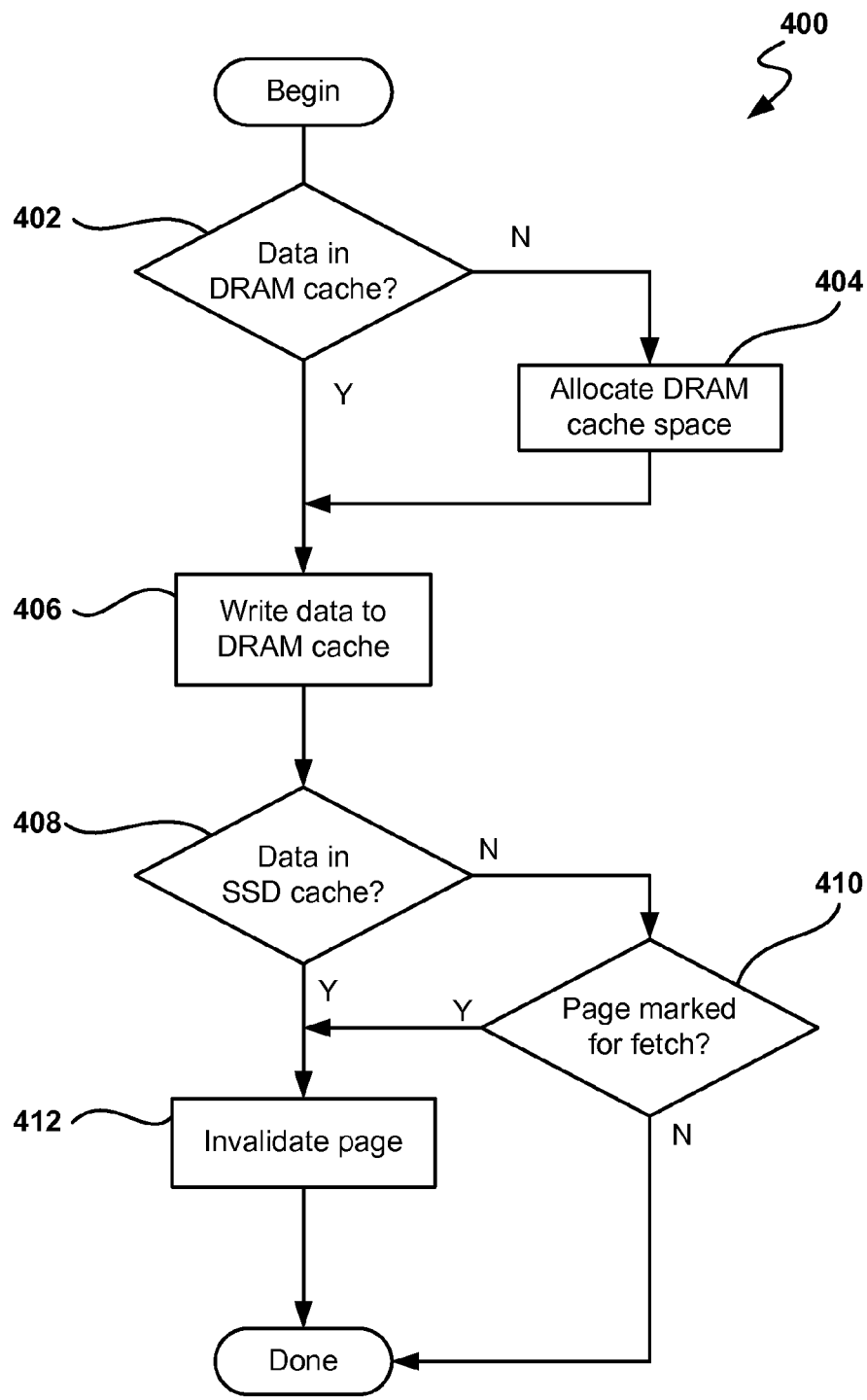
FIG. 4 shows the flow of an algorithm for writing HDD data in accordance with one embodiment of the invention.

FIG. 4 shows the flow of algorithm 400 for writing HDD data in accordance with one embodiment of the invention. Repeated read or writes to the same page are handled by the DRAM cache logic. Writes to a page are stored in the DRAM cache. When this page gets flushed, the page remains in the DRAM cache until the page gets re-used based on a Least Recently Used (LRU) list. Repeated reads or writes always target the DRAM cache, which means that no RR cache page fetches are triggered. The DRAM cache and the RR cache interact when RR cache pages are invalidated upon writes to the DRAM cache.

Once an IO write request is received, the write logic checks if the data to be overwritten is presently in the DRAM cache in operation 402. If the data is not in DRAM cache, then space is allocated in the DRAM cache for storage of the new page in operation 404. In operation 406, the data is written to the DRAM cache and then a check is performed in operation 408 to determine if the data to be overwritten is in the SSD cache. If the data is in the SSD cache then the page is invalidated in the SSD cache in operation 412. The page can be invalidated by having the look up logic return a result that the page is not available in SSD cache. In one embodiment, the page read counter is reset to 0. If the data is not in the SSD cache, the method determines if the page is marked for fetching to the SSD cache in operation 410. If the determination is positive, then the page is invalidated in operation 412, and otherwise the method ends. As a result, the SSD memory performs as a read cache for the HDD storage, but it does not perform as a write cache for the HDD storage.

RR cache pages are re-used based on an LRU list, meaning that RR cache pages that were least recently used (accessed) would be re-used first. Once a SSD cache page was accessed by a read or a fetch, the page will be moved to the end of the LRU list. The result is a wear-leveling-like behavior.

In one embodiment, the RR cache fetch logic assumes that normal read caching is enabled. As previously described, a RR cache lookup is performed when there is a DRAM cache miss. The RR cache lookup will either result in a RR cache hit, in which case the read IO would be re-directed to the SSD, or in a RR cache miss.

Figure 5:
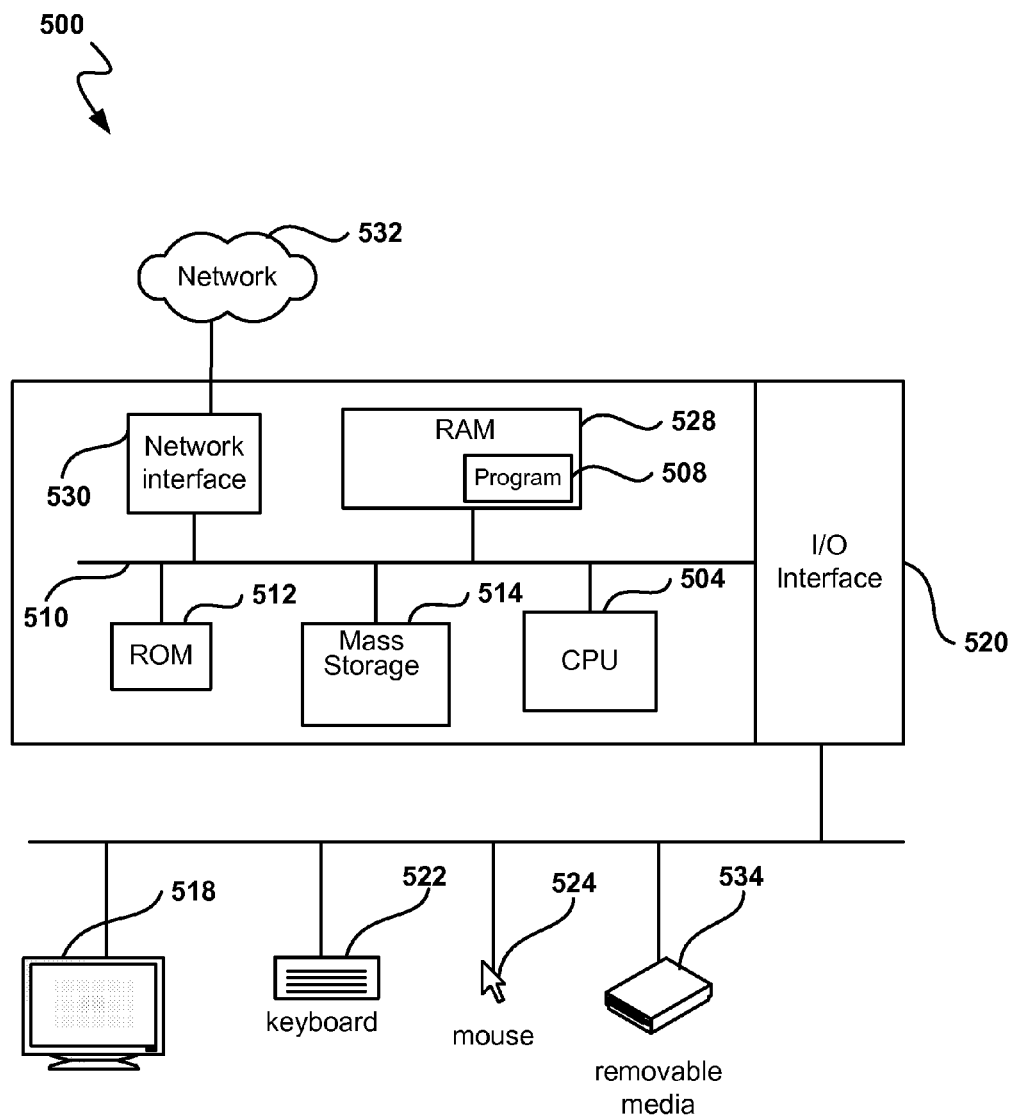
FIG. 5 is a simplified schematic diagram of a computer system for implementing embodiments of the present invention.

FIG. 5 is a simplified schematic diagram of computer system 500 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 5 may be used to manage the SSD cache. The computer system includes a central processing unit (CPU) 504, which is coupled through bus 510 to random access memory (RAM) 506, read-only memory (ROM) 512, and mass storage device 514. SSD memory management program 508 resides in random access memory (RAM) 506, but can also reside in mass storage 514.

Mass storage device 514 represents a persistent data storage device such as a floppy disc drive or a fixed disc drive, which may be local or remote. It should be appreciated that CPU 504 may be embodied in a general-purpose processor, a special purpose processor, or a specially programmed logic device. Display 518 is in communication with CPU 504, RAM 506, ROM 512, and mass storage device 514, through bus 510 and display interface 520. Of course, display 518 is configured to display the user interfaces described herein. Keyboard 522, cursor control 524, and input/output interface 526 are coupled to bus 510 in order to communicate information in command selections to CPU 504. It should be appreciated that data to and from external devices may be communicated through input output interface 526.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for managing computer storage, the method comprising:
   determining whether data corresponding to a read request is available in a solid state drive (SSD) memory when the read request causes a miss in a memory cache;
   serving the read request from the SSD memory when the data is available in the SSD memory; and
   invoking SSD memory tracking logic and serving the read request from a hard disk drive (HDD) when the data is not available in the SSD memory, wherein the invoking the SSD memory tracking logic includes,
   incrementing a page request counter associated with the data;
   determining if the page request counter has reached a threshold value; and
   loading the data corresponding to the read request in the SSD memory when the counter reaches the threshold value, wherein a fetch criteria for the data determines which requests for data are associated with reading random data.

2. The method as recited in claim 1, wherein invoking the SSD memory tracking logic further includes:
   allocating a new tracking element for the data corresponding to the read request when the data is not being tracked by the SSD memory tracking logic.

3. The method as recited in claim 1, wherein reading random data includes requesting data in consecutive read operations to non-sequential blocks of data.

4. The method as recited in claim 1, wherein invoking the SSD memory tracking logic further includes:
   updating the page request counter to eliminate counting requests performed before a predetermined amount of time.

5. The method as recited in claim 1, wherein invoking the SSD memory tracking logic further includes:
   resetting the page request counter periodically.

6. The method as recited in claim 1, wherein invoking the SSD memory tracking logic further includes:
   discarding pages from the SSD memory that have not been used recently.

7. The method as recited in claim 1, wherein the SSD memory has a section that performs as a permanent storage drive containing data which is not in the HDD and a section that performs as a random read cache for the HDD.

8. The method as recited in claim 1, further including:
   utilizing a least recently used (LRU) list to track usage of data in the SSD memory.

9. The method as recited in claim 1, wherein the memory cache is operable to load data from the SSD memory or from the HDD.

10. The method as recited in claim 1, wherein operations of the method are performed by a computer program when executed by one or more processors, the computer program being embedded in a non-transitory computer-readable storage medium.

11. A method for managing computer storage, the method comprising:
   determining whether data corresponding to a read request is available in a solid state drive (SSD) memory when the read request causes a miss in a memory cache;
   serving the read request from the SSD memory when the data is available in the SSD memory; and
   invoking SSD memory tracking logic and serving the read request from a hard disk drive (HDD) when the data is not available in the SSD memory, wherein the invoking the SSD memory tracking logic includes,
      determining whether a fetch criteria for the data has been met, the fetch criteria being met when the read request is associated with reading random data; and
      loading the data corresponding to the read request in the SSD memory when the fetch criteria has been met, wherein the SSD memory acts as a memory read cache and the SSD memory does not act as a write memory cache.

12. The method as recited in claim 11, further including:
   bypassing the SSD memory and going to the HDD when receiving a write request.

13. The method as recited in claim 11, further including:
   determining if a write request is for a page in the SSD; and
   invalidating the page in the SSD when the page exists in the SSD associated with the write request.

14. The method as recited in claim 13, further including:
   re-fetching to the SSD the page associated with the write request.

15. The method as recited in claim 11, wherein an operation to read random data is not an operation to read sequential data.

16. A system for managing computer storage, the system comprising:
   a cache manager;
   HDD storage;
   a RAM cache; and
   an SSD cache, the RAM cache and the SSD cache storing HDD storage data;
   wherein the cache manager determines whether data corresponding to a read request is available in the SSD cache when the read request causes a miss in the RAM cache;
   wherein the read request is served from the SSD cache when the data is available in the SSD cache;
   wherein SSD cache tracking logic is invoked and the read request is served from the HDD storage when the data is not available in the SSD cache, wherein the SSD cache tracking logic determines whether a fetch criteria for the data has been met, the fetch criteria being met when the read request is associated with reading random data, and the SSD cache tracking logic loads the data corresponding to the read request in the SSD cache when the fetch criteria has been met;
   wherein the SSD cache performs as a read cache for the HDD storage and the SSD cache does not perform as a write cache for the HDD storage.

17. The system of claim 16, wherein SSD cache metadata is saved in the HDD storage when the system performs a clean shutdown, wherein the SSD cache metadata is restored to the cache manager from HDD storage when the systems starts after a clean shutdown.

18. The system of claim 16, wherein the SSD cache is initialized without any data after a dirty shutdown.

19. The system of claim 16, wherein the SSD cache includes a plurality of SSD drives.

* * * * *